No. 630,048.  Patented Aug. 1, 1899.
A. H. GILMAN.
LUBRICATING DEVICE.
(Application filed Apr. 12, 1899.)

(No Model.)

Witnesses:
Fred S. Greenleaf
Gustave F. Magnitzky

Inventor
Albert H. Gilman,
by Crosby & Gregory
attys.

United States Patent Office.

ALBERT H. GILMAN, OF SACO, MAINE.

LUBRICATING DEVICE.

SPECIFICATION forming part of Letters Patent No. 630,048, dated August 1, 1899.

Application filed April 12, 1899. Serial No. 712,749. (No model.)

*To all whom it may concern:*

Be it known that I, ALBERT H. GILMAN, of Saco, county of York, State of Maine, have invented an Improvement in Lubricating Devices, of which the following description, in connection with the accompanying drawings, is a specification, like letters on the drawings representing like parts.

This invention has for its object the production of simple, cheap, and effective lubricating means particularly adapted for use with shell-rolls—such, for instance, as are frequently employed in drawing-frames.

By the construction to be hereinafter described the lubricant is presented at two different portions of the surface to be lubricated, insuring a more thorough and even distribution. The shaft has a transverse slot extended therethrough and extended longitudinally of the shaft to receive suitable absorbent material adapted to be impregnated with lubricant which is transferred to the inner surface of the surrounding roll by relative rotation of the roll and shaft.

Various features of my invention will be hereinafter described, and particularly pointed out in the following claims.

Figure 1:
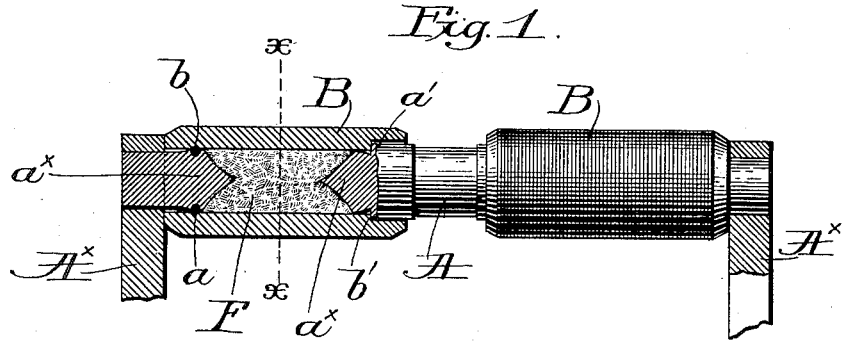
Figure 2:
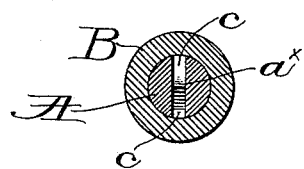
Figure 3:
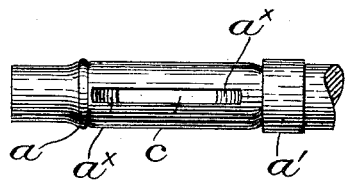

Figure 1, in side elevation and partial longitudinal section, represents a shell-roll and coöperating shaft with my invention embodied therein. Fig. 2 is a cross-sectional detail taken on the line $x\,x$, Fig. 1; and Fig. 3 is a detail in elevation of the shaft with the absorbent material omitted from the slot.

Referring to Fig. 1 of the drawings, I have herein shown for the purpose of illustrating my invention a shaft A, mounted in suitable bearings $A^\times$ and supporting two shell-rolls B, the latter being shown as drawing-rolls, such as are well known in textile machinery. The shaft is provided, as shown in the sectional portion of Fig. 1, with an expansible ring $a$, adapted to fit in a suitable groove $b$ in the interior of the shell-roll when the latter is mounted on the shaft, the interior end of the roll having an annular shoulder $b'$ to abut against the shoulder formed by the enlarged portion $a'$ of the shaft. I form a slot in the shaft, extended transversely completely therethrough and extended in the direction of the length of the shaft, to receive felt or other suitable absorbent material F, Fig. 1, which is impregnated with oil or other desired lubricant before the roll is slipped into place, said absorbent material being exposed at opposite portions of the surface of the shaft to contact with the interior surface of the roll to maintain the contacting surfaces of the roll and shaft lubricated.

In order to form the slot expeditiously and cheaply, I subject the shaft to the action of a circular milling-tool, the axis of rotation of which is at right angles to the longitudinal center of the shaft to form a lunette-shaped recess, and after forming one slot the shaft is turned and the opposite portion thereof subjected to the action of the cutter to form a second similarly-shaped slot, which intersects the first, as shown in Fig. 1. In Figs. 2 and 3 the slot is indicated at $c$. It will be manifest that the slot may be made very rapidly, cheaply, and accurately by this mode of procedure, and the inwardly-projecting lugs $a^\times$ at or near each end of the slot serve as retaining devices to maintain the absorbent material F in place.

I prefer to so form the slot that it will intersect the longitudinal center of the shaft, so that the open sides of slot, and consequently the exposed portions of the absorbent material, will be diametrically opposite each other.

A piece of felt notched at its ends to thus correspond substantially in outline to the shape of the slot in the shaft forms a very convenient carrier or material to hold the lubricant.

As the absorbent material is completely covered by the surrounding roll, access of air thereto is largely prevented, and after being thoroughly impregnated with lubricant renewal is only required at long intervals.

By applying the lubricant at two different portions of the roll I overcome any tendency to improperly lubricate, as would be the case were the lubricant only applied at one point, for wear of the roll or shaft would allow certain play between them and it might so happen that the draft on the roll would cause the clearance to prevent contact of the inner surface of the roll with the material carrying the lubricant.

While I have herein shown a drawing-roll and its supporting-shaft with my invention embodied therein, my invention is not restricted to such use only, nor is it restricted to the rotation of the roll or sleeve-like member on the shaft, for it will be manifest that rotation of one relative to the other will effect proper lubrication of the bearing-surfaces.

Having fully described my invention, what I claim, and desire to secure by Letters Patent, is—

1. A shaft, and a surrounding shell-roll, one being rotatable relative to the other, the shaft having a transverse slot therethrough extended in the direction of its longitudinal axis, a retaining-lug at each end of and within the slot, and absorbent material held in the slot and exposed at the surface of the shaft, to convey lubricant with which it is impregnated to the interior of the shell-roll.

2. A shell-roll, a shaft on which it is rotatably mounted, said shaft having opposed and intersecting lunette-shaped slots therein extended longitudinally of the shaft, and absorbent material adapted to be impregnated with lubricant, inserted in the slot and exposed at the surface of the shaft.

3. A rotatable member, a supporting-shaft therefor having opposed and intersecting lunette-shaped slots therein extended longitudinally of the shaft and passing through its axis, and absorbent material held in said slot and impregnated with lubricant.

In testimony whereof I have signed my name to this specification in the presence of two subscribing witnesses.

ALBERT H. GILMAN.

Witnesses:
GEORGE A. EMERY,
PHILIP C. TAPLEY.